United States Patent [19]
Yano

[11] Patent Number: 5,284,367
[45] Date of Patent: Feb. 8, 1994

[54] FLEXIBLE PIPE JOINT

[76] Inventor: Kazuo Yano, 12-6, Minaimiyukigaya 3-chome, Ota-ku, Tokyo, Japan

[21] Appl. No.: 914,919

[22] Filed: Jul. 17, 1992

[30] Foreign Application Priority Data

Apr. 1, 1992 [JP] Japan .................. 4-105294

[51] Int. Cl.$^5$ .................................. F16L 27/04
[52] U.S. Cl. ............................ 285/51; 285/166; 285/226; 285/261
[58] Field of Search ............... 285/51, 226, 166, 261, 285/45, 229, 370, 371, 160, 168

[56] References Cited

U.S. PATENT DOCUMENTS

| 205,069 | 6/1878 | Farnsworth | 285/166 |
|---|---|---|---|
| 396,908 | 1/1889 | Wiseman | 285/166 X |
| 1,884,944 | 10/1932 | Williams | 285/45 X |
| 2,519,147 | 8/1950 | Miller | 285/261 X |
| 2,564,938 | 8/1951 | Warren | 285/166 X |
| 2,712,456 | 7/1955 | McCreery | 285/166 X |
| 3,669,470 | 6/1972 | Deurloo | 285/226 X |
| 4,035,004 | 7/1977 | Hengesbach | 285/166 |
| 4,553,775 | 11/1985 | Halling | 285/166 X |
| 4,776,617 | 10/1988 | Sato | 285/166 X |
| 4,946,202 | 8/1990 | Perricone | 285/166 |
| 5,089,487 | 12/1991 | Sheppard | 285/226 |
| 5,149,140 | 9/1992 | Simoni | 285/166 |

FOREIGN PATENT DOCUMENTS

| 2231110 | 1/1974 | Fed. Rep. of Germany | 285/166 |
|---|---|---|---|
| 0430365 | 12/1948 | Italy | 285/166 |
| 0527690 | 10/1940 | United Kingdom | 285/261 |

Primary Examiner—Randolph A. Reese
Assistant Examiner—Heather Chun
Attorney, Agent, or Firm—Fisher & Associates

[57] ABSTRACT

A flexible pipe joint capable of joining connecting portions of connected objects such as pipes to each other while permitting the direction of joining between both to be varied as desired. First and second joint members (11,31) are formed with spherical inner surfaces (13,37) which slidably contact spherical outer surfaces (54,56) on an interpolating member (51) located between the joint members. Thus, the interpolating member (51) is rockable relative to the joint members (11,31) about the centre of each of the spherical outer surfaces (54,56). Press rings (16,40) are arranged to keep both spherical outer (54,56) and inner (13,37) surfaces in contact with each other through bearing balls (23,47).

5 Claims, 3 Drawing Sheets

FLEXIBLE PIPE JOINT

BACKGROUND OF THE INVENTION

1. Field of the Invention

The present invention relates to a flexible pipe joint including a set of joint members which are connected to each other and rockable relative to each other, thereby permitting the direction of connection between both joint members to be varied as desired.

2. Description of the Prior Art

In general, a pipe joint is used to join a set of objects to be connected (hereinafter referred to as "connected objects") such as, for example, piping for connection to a suitable piece of equipment, connecting pipes in any such equipment, or any combination of piping and pipes to each other.

A conventional pipe joint used for this purpose is adapted to join the connected objects to each other non-movably in a direction which is predetermined by the pipe joint.

However, the direction of joining between the connected objects is often required to be varied depending on the connecting portions of the connected objects. More particularly, the direction of joining between the connected objects is not necessarily fixedly specified for various reasons and therefore, a conventional non-adjustable pipe joint fails to provide satisfactory joining.

SUMMARY OF THE INVENTION

Accordingly, it is an object of the present invention to provide a flexible pipe joint which is capable of joining the connecting portions of connected objects to each other while permitting the direction of joining to be varied as desired.

It is another object of the present invention to provide a flexible pipe joint which is capable of joining connected objects whose connecting portions incorporate a male member and a female member for plug-in one-touch connection while permitting the direction of joining to be varied as desired.

According to the present invention, there is provided a flexible pipe joint for joining two connected objects comprising: a first joint member formed with a first flow passage, and a first part-spherical inner surface of a predetermined diameter in the region of one and, the other end being adapted to be connected directly or indirectly to one of the connected objects; and a second joint member formed with a second flow passage, and a second part-spherical inner surface of a predetermined diameter in the region of one end, the other end being adapted to be connected directly or indirectly, to the other of the connected objects; characterised by: an interpolating member formed with an intermediate flow passage which communicates with the first and second flow passage in the first and second joint members in the interpolating member having first and second part-spherical outer surfaces formed at respective ends each having a diameter suitable to permit the first and second spherical outer surfaces to make a rockable and slidable contact with the first and second spherical inner surfaces, respectively; and by first and second restraining means which the first and second spherical inner surfaces in respective slidable contact with the first and second spherical outer surfaces.

In accordance with one aspect of the present invention, a flexible pipe joint is provided which is adapted to join the joint members of the joint to a connecting portion of connected objects and connect the joint members to each other through the interpolating member while rendering the joint members rockable in relation to the interpolating member about centres of the spherical surfaces. The flexible pipe joint according to this aspect of the invention includes first and second rings fixed to the first and second joint members and including first and second ball bearings for interposedly holding the first and second spherical outer surfaces while keeping the first and second spherical outer surfaces in slidable contact with the first and second spherical inner surfaces, respectively.

In a preferred embodiment of the present invention, one from each pair of engaging inner and outer spherical surfaces is provided with a sealing groove, in which a packing is arranged. Preferably, a flexible fit-on member is arranged to cover the outer periphery of the interpolating member and to connect the first and second joint members or press rings to each other.

In the flexible pipe joint of this aspect of the present invention constructed as described above, the interpolating member is connected to the first joint member while rockably contacting the first spherical outer surface of the interpolating member with the first spherical inner surface of the first joint member and is connected to the second joint member in a manner to contact rockably the second spherical outer surface of the interpolating member with the second spherical inner surface of the second joint member. Also, the first press ring and second press ring are preferably threadedly fixed to the first joint member and second joint member to hold the first bearing balls and second bearing balls, respectively. Such a construction permits the interpolating member to be connected rockably to the first and second joint members so as to be rockable about the centres of the spherical outer surfaces of the interpolating member.

Also, the presence of the packing in each of the sealing grooves effectively prevents any leakage of fluid between the spherical outer surfaces of the interpolating member and the spherical inner surfaces of the joint members, thus providing a pipe joint with high operational reliability. In addition, the location of the flexible fit-on member between the first press ring and the second press ring, covering the outer periphery of the interpolating member effectively prevents any foreign substances such as dust or the like from entering the pipe joint, while ensuring its flexibility.

In accordance with another aspect of the present invention, a flexible pipe joint is provided which is adapted to join relatively flexibly of connected objects whose connecting portions incorporate a male member and a female member for plug-in one-touch connection. In this case, the first joint member has one of a female member and a male member directly or detachably incorporated therein in correspondence to one of the male member and female member of the connected objects, and the second joint member has the other of the female member and male member directly or detachably incorporated therein in correspondence to the other of the male member and female member of the connected objects.

Again, any one of each of the spherical inner surfaces and each of the spherical outer surfaces may be provided with a sealing groove, in which a packing is arranged.

In the flexible pipe joint of this aspect of the invention, the female and male members of the joint members are joined to the male and female members incorporated in the connecting portions of the connected objects by plug-in one-touch connection. Also, the interpolating member is connected to the first joint member while rockably contacting the first spherical outer surface of the member with the first spherical inner surface of the first joint member and connected to the second joint member in a manner to rockably contact the second spherical outer surface of the member with the second spherical inner surface of the second joint member. Further, the first and second restraining means act to keep the spherical outer surface and spherical inner surfaces slidably contacted with each other. Thus, the interpolating member contact with the spherical inner surfaces of the joints members contacted with the spherical inner surfaces of the joints members, respectively.

Also, arrangement of the packing in each of the sealing grooves effectively prevents leakage of fluid between the spherical outer surfaces of the interpolating member and the spherical inner surfaces of the joint members to provide the pipe joint with high reliability in operation. Further, arrangement of the flexible fit-on member between the first press ring and the second press ring in a manner to cover an outer periphery of the interpolating member effectively prevents any foreign substance such as dust or the like from entering the pipe joint while ensuring flexibility of the pipe joint.

BRIEF DESCRIPTION OF THE DRAWINGS

The present invention may be carried into practice in various ways and some embodiments will now be described by way of example with reference to the accompanying drawings, in which:

FIG. 1 shows a first embodiment of a flexible pipe coupling according to the present invention. The flexible pipe joint of the illustrated embodiment includes a first joint member 11 and a second joint member 51, and an interpolating member 51 which flexibly or rockably connects the joint members 11 and 31 to each other. The joint members (11,31) are adapted to be joined to connected objects, connecting pipes in such equipment, or any combination of piping and pipes.

Figure 1:
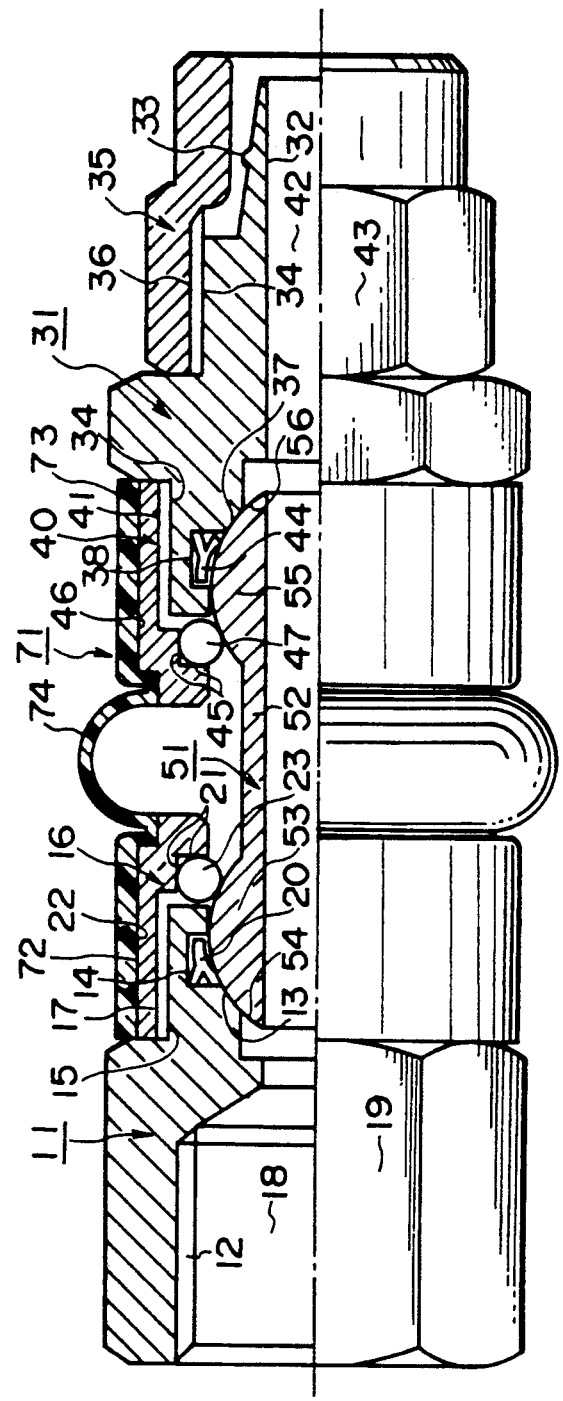
FIG. 1 is a side elevation, partly in section of a first embodiment of a flexible pipe joint according to the present invention.

The first joint member 11 is provided with a female thread portion 12 adapted for thread connection to the end (not shown) of a connected object, a first spherical inner surface 13 of a predetermined inner diameter formed with a first sealing groove 14 and a male thread portion 15 threadedly fitted to a female thread portion 17 in a first press ring 16. The first joint member 11 has a first axial flow passage 18 and its outer peripheral surface 19 is hexagonally-shaped so that a wrench may be fitted to the joint member 11 for operation. The first flow passage 18 acts as a part of a connection flow passage.

BRIEF DESCRIPTION OF THE PREFERRED EMBODIMENT

The first sealing groove 14 houses a first packing such as a Y-shaped, an O-ring or the like, suitable for sealing fluid such as liquid, gas or the like flowing through the connection flow passage. In the illustrated embodiment, a Y-shaped packing is used with its forked portion expanded towards the connection flow passage. The first press ring 16 is formed on its inner side with an inner grooved press surface 21 for pressedly supporting a series of first bearing balls 23 with a clearance sufficient to permit the balls 23 to roll in a predetermined manner. On its outer periphery, the first press ring 16 is formed with an outer holding surface 22 for securely receiving one holding portion 72 of a flexible fit-on member 71.

The second joint member 31 includes: a connection end 32 provided thereon with a rib or projection 33 and adapted to be inserted into the end of a connected object (not shown) meeting predetermined qualification such as a connection hose; a male thread portion 34 on which a female thread portion 36 formed in a stop ring 35 for engaging the end of the connected object is threadedly fitted; a second spherical inner surface 37 of a predetermined diameter provided with a second sealing groove 38; and a male thread portion 39 threadedly fitted to a female thread portion 41 formed in a second press ring 40. The second joint member 31 has a second axial flow passage 42 and its outer peripheral surface 43 is hexagonally-shaped so that a wrench may be fitted on the joint member 31 for operation. The second flow passage 42 acts as another part of the connection flow passage.

The second sealing groove 38 similarly houses a second Y-shaped packing 44 suitable for sealing fluid such as liquid, gas or the like flowing through the connection flow passage. The second press ring 40 is formed with an inner grooved press surface 45 for pressedly supporting a series of second bearing balls 47 with a clearance sufficient to permit the balls 47 to roll in a predetermined manner. On its outer periphery, the second press ring 40 is formed with an outer holding surface 46 for securely receiving the other holding portion 73 of the flexible fit-on member 71 which is contiguous with the one holding portion 72 through an intermediate flexible portion 74.

The interpolating member 51 includes an intermediate portion 52, a first rocking portion 53 provided at one end of the intermediate portion 52 and a second rocking portion 55 arrayed at the other end of the intermediate portion 52. The first rocking portion 53 includes a first spherical outer surface 54 whose diameter is sufficient to permit the surface 54 to be rockably and slidably contacted with the first spherical inner surface 13 of the first joint member 11, to form a fluid-tight seal with the first Y-shaped packing 20 and to be in contact with and smoothly movable relative to the first spherical inner surface 13 while being held in position by means of the first bearing balls 23. The second rocking portion 55 includes a second spherical outer surface 56 whose diameter is sufficient to permit the surface 56 to be rockably and slidably contacted with the second spherical inner surface 37 of the second joint member 31 and to form a fluid-tight seal with the second Y-shaped packing 44. It is in contact with and smoothly movable relative to the second spherical inner surface 37 while being held in position by means of the second bearing balls 47. The interpolating member 51 has an intermediate axial flow passage 57 communicating with the first and second flow passages 18 and 42, and thus constitutes a further part of the connection flow passage.

In the flexible pipe joint of the illustrated embodiment, as described above, the interpolating member 51 is rockably connected to the first joint member 11 while its first spherical outer surface 54 slidably contacts the first spherical inner surface 13 of the first joint member 31 with its second spherical outer surface 56 slidably contacting with the second spherical inner surface 37 of the second joint member 31. Also, the first press ring 16 and the second press ring 40 are threadedly fixed to the first joint member 11 and second joint member 31 to hold the first bearing balls 23 and second bearing balls 47, respectively. Such a construction permits the interpolating member 51 to be connected to the first and second joint member 11 and 31 in such a way that it is rockable about the centre of reach of the spherical outer surfaces 54 and 56 which are in contact with the spherical inner surfaces 13 and 37 of the joints members 11 and 31, respectively. In addition, the presence of the first ball bearing 23 and second ball bearing 47 between the interpolating member and the respective press rings 16,40 ensures that rocking of the interpolating member 51 relative to the joint members 11 and 31 can take place very smoothly. This results in the connection between the flexible pipe joint and the connected objects being achieved in a flexible or rockable manner, as desired.

In the illustrated embodiment, the first and second spherical inner surfaces 13 and 37 are formed with the first and second sealing grooves 14 and 38 in which the first and second Y-shaped packings 20 and 44 are arranged. This ensures sealing between the spherical inner surfaces 13, 37 and the spherical outer surfaces 54, 56 respectively. Such a construction effectively prevents the leakage of fluid between the spherical outer surfaces and the spherical inner surfaces to provide a pipe joint with high reliability. Also, the flexible fit-on member 71 is arranged between the first press ring 16 which threadedly fixed on the first joint member 11 and the second press ring 40 which is threadedly fixed on the second joint member 31, thus covering the outer periphery of the interpolating member 51. This effectively prevents any foreign substances such as dust or the like from entering the pipe joint, while ensuring flexibility of the joint.

It is desirable for the spherical inner surfaces 13, 37 and spherical outer surfaces 54, 56 to be provided with suitable means such as lapping or the like to permit the sliding contact between the inner and outer surfaces to occur while the contact is kept tight. In the illustrated embodiment, as described above, the spherical inner surfaces 13 and 37 are formed with the sealing grooves 14 and 38, in which the Y-shaped packings 20, 44 are fitted, respectively. Alternatively, the embodiment may be so constructed that the sealing grooves 14 and 38 are provided on the spherical outer surfaces 54 and 56 of the first and second rocking portions 53 and 55 of the interpolating member 51 and the Y-shaped packings are arranged in these grooves.

Figure 2:
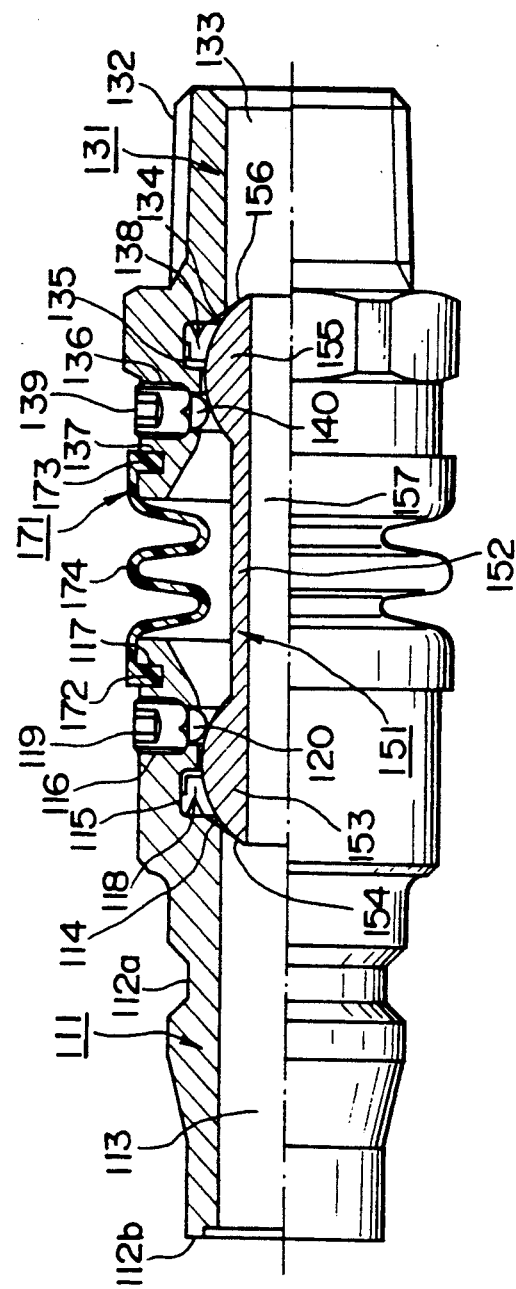
FIG. 2 is a side elevation, partly in section a second embodiment of a flexible pipe joint according to the present invention.

FIG. 2 shows an alternative embodiment of a flexible pipe coupling according to the present invention. The flexible pipe joint of this embodiment is generally constructed to accommodate a female member (not shown) of the plug-in one-touch connection type known in the art incorporated into a connecting portion of one of connected objects, and so a male member of the plug-in one-touch connection type known in the art is incorporated directly into the connected portion of one of joint members (in the illustrated embodiment, a connected portion of a first joint member ), thereby rendering coupling by plug-in one-touch connection possible, and a connected portion of the other joint member (a second joint member) is threadedly jointed to a connecting portion of the other connected object.

More particularly, the embodiment illustrated in FIG. 2 includes a first joint member 111 and a second joint member 131 which are adapted to be connected to connected objects such as, for example, piping for connection in suitable equipment, connecting pipes in such equipment, or any combination of the piping and pipes by plug-in one-touch connection. A connected portion of the first joint member 111 (one connected portion) is formed into a shape suitable for it to function as a male member for plug-in one-touch connection and a connected portion of a second joint member 131 (the other connected portion) is provided with external threads 132 for engagement. The flexible pipe joint of the illustrated embodiment also includes an interpolating member 151 for flexibly connecting both first and second joint members 111 and 113 to each other.

The connected portion of the first joint member 111, as described above, is formed into a shape suitable for it to exhibit the functions required in a male member for plug-in one-touch connection. Thus, it is provided with a holding groove 112a for maintaining the plug-in connection and a projecting end 112b open to a flow passage in a mating female member. The connected portion of the first joint member 111 is also formed with a first axial flow passage 113 constituting a part of a connection flow passage. The first joint member 111 is formed on the side of the first flow passage 113, or on its inner surface, with a first spherical inner surface 114 with a predetermined diameter, a first sealing groove 115 and a first threaded hole 116. The first sealing groove 115 is displaced inwards of the centre of the first spherical inner surface 114 and the first threaded hole 116 is displaced outwards of the centre.

The first joint member 111 also has at the opposite end to the projecting end 112b an outer holding groove 117 formed in it outer surface, for housing one holding portion 172 of a flexible fit-on member 171. In addition, the first sealing groove 115 packing, an O-ring or the like, suitable for preventing leakage of fluid such as liquid, gas or the like flowing through the connection flow passage. In the illustrated embodiment, a Y-shaped packing is arranged for this purpose in such a manner that its forked portion expands towards the connection flow passage. The first threaded hole 116 includes in its distal end a first holding screw 119 for rollably holding bearing balls 120.

The connected portion of the second joint member 131, as described above, has external threads 132 for engagement and has a second axial flow passage 133 constituting another part of the connection flow passage in the same manner as the first joint member 111. In addition, the second joint member 131 is formed on the side of the second flow passage 133 or on its inner surface, with a second spherical inner surface 134 of a predetermined diameter, a second sealing groove 135 and a second threaded hole 136. The second sealing groove 135 is displaced inwards of the centre of the second spherical inner surface 134 and the second threaded hole 136 displaced outwards of the centre.

The second joint member 131 has at the end opposite to the threads 132 an outer holding groove 137 in its outer surface, for holding the other holding portion 173 of the flexible fit-on member 171. The second sealing groove 135 houses a second packing 138 such as a Y-shaped packing, an O-ring or the like suitable for preventing leakage of fluid such ass liquid, gas or the like flowing through the connection flow passage. In the illustrated embodiment, a Y-shaped packing is arranged for this purpose in such a manner that its forked portion expands towards the connection flow passage. The second threaded hole 136 includes in its distal end a second holding screw 139 for rollably holding bearing balls 140.

The interpolating member 151 includes an intermediate portion 152, a first rocking portion 153 at one end of the intermediate portion 152 and a second rocking portion 155 at the other end of the intermediate portion 152. The first rocking portion 153 includes a first spherical outer surface 154 whose diameter is sufficient to permit the surface to be rockably and slidably contacted with the first spherical inner surface 114 of the first joint member 111, to form a fluid-tight seal with the first Y-shaped packing to be in contact with and smoothly movable relative to the first spherical inner surface 114 while being held in position by means of the first bearing balls 20. The second rocking portion 155 includes a second spherical outer surface 156 whose diameter is sufficient to permit the surface 156 to be rockably and slidably contacted with the second spherical inner surface 134 of the second joint member 131, to form a fluid-tight seal with the second Y-shaped packing 138, and to be in contact with and smoothly movable relative to the second spherical inner surface 134 while being held in position by means of the second bearing balls 140. Also, the interpolating member 151 is formed with an intermediate axial flow passage 157 connection to the first and second flow passages 113 and 133, and thus constitutes a further part of the connection flow passage.

In the flexible pipe joint of the illustrated embodiment, as described above, the interpolating member 151 is connected to the first joint member 111 while its first spherical outer surface 154 slidably contacts the first spherical inner surface 114 of the first joint member 111, and is connected to the second joint member 131 in such a way that the second spherical outer surface 156 of the second rocking portion 155 of the member 152 rockably and slidably contacts the second spherical inner surface 134 of the second joint member 131.

The interpolating member 151 is held by means of the first and second bearing balls 120 and 140 located in the first and second threaded holes 116 and 136 of the first and second joint members 111 and 113 while being kept in slidable contact with the first and second joint members 111 and 113, respectively. This construction permits the interpolating member 151 to be connected to the first and second joint members 111 and 131 so as to be rockable about a centre of each of the spherical outer surfaces 154 and 156 of the interpolating member 151. This results in the connection between the flexible pipe joint and the connected objects being achieved with articulation at two positions, as desired.

The first and second spherical inner surfaces 114 and 134 are formed with the first and second sealing grooves 115 and 135 in which the first and second Y-shaped packings 118 and 138 are housed, in order to ensure sealing between the spherical inner surfaces 114, 134 and the spherical outer surfaces 154, 156, respectively. Such a construction effectively prevents leakage of fluid between the spherical outer surfaces and the spherical inner surfaces. Also, the flexible fit-on member 171, which includes the intermediate flexible portion 174 following the sliding movement of the joint members, is arranged between the first holding groove 117 in the outer periphery of the first joint member 11 and the second holding groove 137 in the outer periphery of the second joint member 131 in a manner to cover the outer periphery of the interpolating member 151. This effectively prevents any foreign substances such as dust or the like from entering the pipe joint while ensuring flexibility of the pipe joint.

It is desirable for the spherical inner surfaces 114, 134 and spherical outer surfaces 154, 156 to be provided with suitable means such as lapping or the like to permit sliding contact between the inner and outer surfaces to occur while the contact is kept tight. In the illustrated embodiment, as described above, the spherical inner surfaces 114 and 134 are formed with the sealing grooves 115 and 135, in which the Y-shaped packing 118 and 138 are fitted, respectively. Alternatively, the embodiment may be so constructed that the sealing grooves 115 and 135 are provided on the spherical outer surfaces 154, 156 and the Y-shaped packings 118 and 138 are arranged in these grooves.

The remaining part of the embodiment shown in FIG. 2 may be constructed in substantially the same manner as that of FIG. 1.

Figure 3:
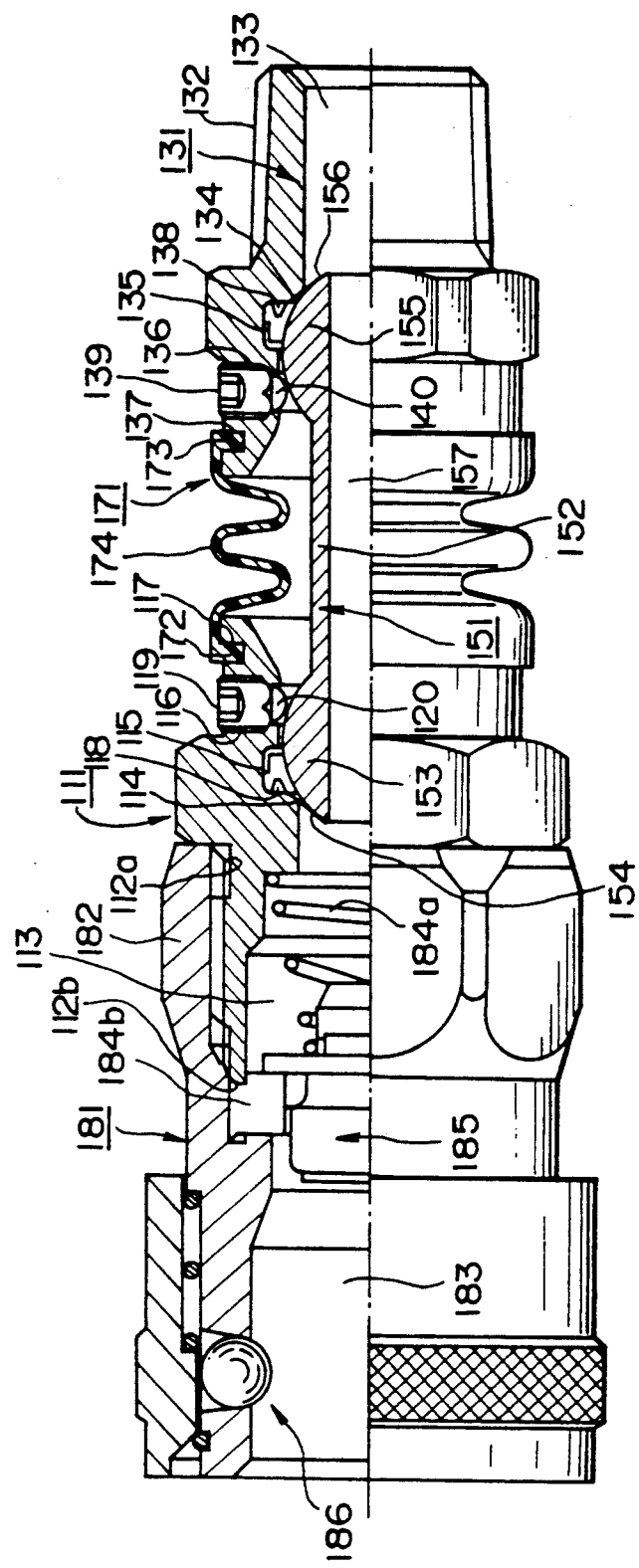
FIG. 3 is a side elevation partly in section generally showing a modification of the flexible pipe joint of FIG. 2.

FIG. 3 shows a modification of the flexible pipe joint shown in FIG. 2. The flexible pipe joint of this modification is constructed to accommodate a male member (not shown) of the plug-in one-touch connection type known in the art incorporated in a connecting portion of one of connected objects. A male member provided with a groove 112a for engagement and a projecting end 112b is directly incorporated in the connected portion of one of joint member (a connected portion of a first joint member 111 with the illustrated embodiment) and a female member 181 of the plug-in one-touch type known in the art is detachably located thereon and so joining by plug-in one-touch connection is made possible. Also, in the pipe joint of the modification, the connected portion of the outer joint member (a second joint member) is threadedly jointed to a connecting portion of other connected object.

More specifically, the flexible joint shown in FIG. 3 is constructed in substantially the same manner as that shown in FIG. 2 except that the female member 181 of the plug-in one-touch connection type is detachably incorporated on the connecting portion of the first joint member 111. The female member 181 is threadedly jointed to the connecting portion of the first joint member 111 through a packing 184b in a manner well known in the art. Also, the female member 181 includes a body 182 with an internal flow passage 183, a valve member 185 for constantly carrying out interruption between the inner flow passage 183 and a first flow passage 112 by means of a spring 184a and permitting both flow passages to communicate with each other by means of projecting end 112b at the time of plug-in connection, and a restraining member 186 for restraining the groove for maintaining plug-in connection. Thus, it will be noted that the modification of FIG. 3 exhibits the same function and advantage as the embodiment of FIG. 2.

What is claimed as new and desired to be secured by letters patent of the United States is:

1. A flexible pipe joint for joining two connected objects comprising;

a first joint member formed with a first flow passage, and a first part-spherical inner surface of a predetermined diameter in the region of one end, the other end being adapted to be connected directly or indirectly to one of the connected objects; a second joint member formed with a second flow passage, and a second part-spherical inner surface of a predetermined diameter in the region of one end, the other end being adapted to be connected directly or indirectly, to the other of the connected objects;

an interpolating member formed with an intermediate flow passage which communicates with the first and second flow passage in the first and second joint members in the interpolating member having first and second part-spherical outer surfaces formed at respective ends each having a diameter suitable to permit the first and second spherical outer surfaces to make a rockable and slidable contact with the first and second spherical inner surfaces respectively; and first restraining means comprising a first ring fixed to the first joint member and including a first ball bearing which engages the first spherical outer surface, and a second restraining means comprising a second ring fixed to the second joint member and including a second ball bearing which engages the second spherical outer surface, in which the first and second restraining means act to keep the first and second spherical outer surfaces in slidable contact with the first and second spherical inner surfaces, respectively such that said first, second and intermediate flow passage can selectively be in axial alignment or adjusted relative to said axial alignment.

2. A flexible pipe joint as defined in claim 1, wherein one form of each pair of engaging inner and outer spherical surfaces is provided with a sealing groove in which a packing is housed.

3. A flexible pipe joint as defined in claim 1, further comprising a flexible fit-on member arranged to cover the outer periphery of the interpolating member and to connect first and second joint members to each other.

4. A flexible pipe joint as defined in claim 3, wherein said fit-on member is connected to the first and second rings.

5. A flexible pipe joint for relatively flexibly joining connected objects whose connecting portions incorporate a male member and a female member for plug-in one-touch connection defined in claim 1, wherein said first joint member directly or indirectly incorporates a female member or a male member in correspondence to a male member or a female member on the respective connected object, and said second joint member directly or detachably incorporates a male member or a female member in correspondence to a female member or a male member on the other respective connected object.

* * * * *